March 17, 1959 R. F. LAURENCE 2,878,314

LOUD-SPEAKING TELEPHONE SYSTEMS

Filed Feb. 15, 1955 2 Sheets-Sheet 1

Inventor
R. F. Laurence
By Glascock Downing & Seebold
Attys.

March 17, 1959 R. F. LAURENCE 2,878,314

LOUD-SPEAKING TELEPHONE SYSTEMS

Filed Feb. 15, 1955 2 Sheets-Sheet 2

Inventor

R. F. Laurence

By Glascock Downing & Seebold

Attys.

United States Patent Office 2,878,314

Patented Mar. 17, 1959

2,878,314

LOUD-SPEAKING TELEPHONE SYSTEMS

Roger F. Laurence, Guildford, England, assignor to Winston Electronics Limited, Hampton, England Application February 15, 1955, Serial No. 488,287

4 Claims. (Cl. 179—1)

This invention relates to a loud-speaking telephone system for two, three or four wire lines of the kind in which in order that the loop gain may be less than unity for any loop and oscillations shall not occur, a proportion of the signal in each channel is rectified and the resultant fluctuating direct signals are compared by a muting control circuit and the channel producing the smaller signal is muted, so that either the transmit or receive channel is muted at any time in accordance with the signal conditions in the channel.

The direct voltage is normally developed from the audio-frequency output by a rectifier system with a condenser input filter having a pick-up time of three milliseconds or less to avoid clipping of initial speech syllables.

The discharge time of the condenser input filter is made longer than the pick-up time e. g. by 100 milliseconds in the case of the rectifier associated with the unmuted channel. By pick-up time is meant the time from the moment when the reservoir condenser starts charging due to a signal applied to the rectifier to the time when the voltage across the condenser reaches $1/e$ of the peak value of the applied signal.

According to the invention the ratio of signal amplitude from the microphone or line before muting to direct control voltage or current produced by it at the muting control circuit is made greater in the case of the muted channel than in the case of the unmuted channel.

Conveniently, one channel is muted about one millisecond before the other is released during changeover.

To overcome the difficulties caused by the proximity of the microphone to the loud-speaker as compared to the operator the proportion of the signals from the microphone fed to the rectifier associated with it is increased when the station is transmitting.

Similarly, to reduce the difficulties caused by coupling at the line connection of two wire systems and between remote loud-speaker and microphone of any system, the proportion of the incoming signals fed to the associated rectifier is reduced when the station is transmitting and increased when the station is receiving. The muting control system must not introduce any large transients in the equipment when it operates.

The muting control circuit should have "backlash" so that the output of the signal rectifier associated with the muted channel must become appreciably larger than the output of that associated with the released channel, before the muting control circuit mutes the released channel and releases the muted channel.

When used on two wire lines the equipment should be connected to the line by a transformer in the output circuit of a valve amplifier stage. A similar valve amplifier stage and transformer should be supplied, in parallel with the first, with signals originating from the microphone. The output windings of the transformers should be connected in phase opposition to the receiving amplifier.

With this arrangement signals from the microphone are cancelled at the input to the receiving amplifier while line signals are fed directly.

The muting system should not completely suppress the signals supplied to the distant operator from the local operator, so as to avoid the "dead" feeling which this gives the equipment.

The control rectifiers should be supplied by separate amplifiers and not by amplifiers in the main speech channels, to avoid distortion of the speech received at the other end.

Alternatively, the high frequency components of the speech signals may be emphasized and after the amplifier stage which drives the rectifier, and which is also in the speech channel, the relative amplitude of the high frequency components i. e. the ratio of the voltage of the signal from the microphone or line (before muting) to the direct voltage produced by it across the reservoir condenser associated with the rectifiers may be subsequently reduced by means of a filter network, so that the effect of the distortion introduced by the loading of the rectifier system is minimised.

The invention will be further described with reference to embodiments shown in the accompanying drawings.

Figure 1:
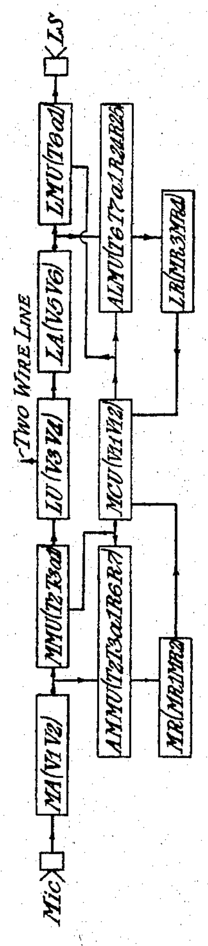
Figure 1 is a schematic of a two-wire loud-speaking telephone made according to the invention, and shows one complete station.
Figure 2:
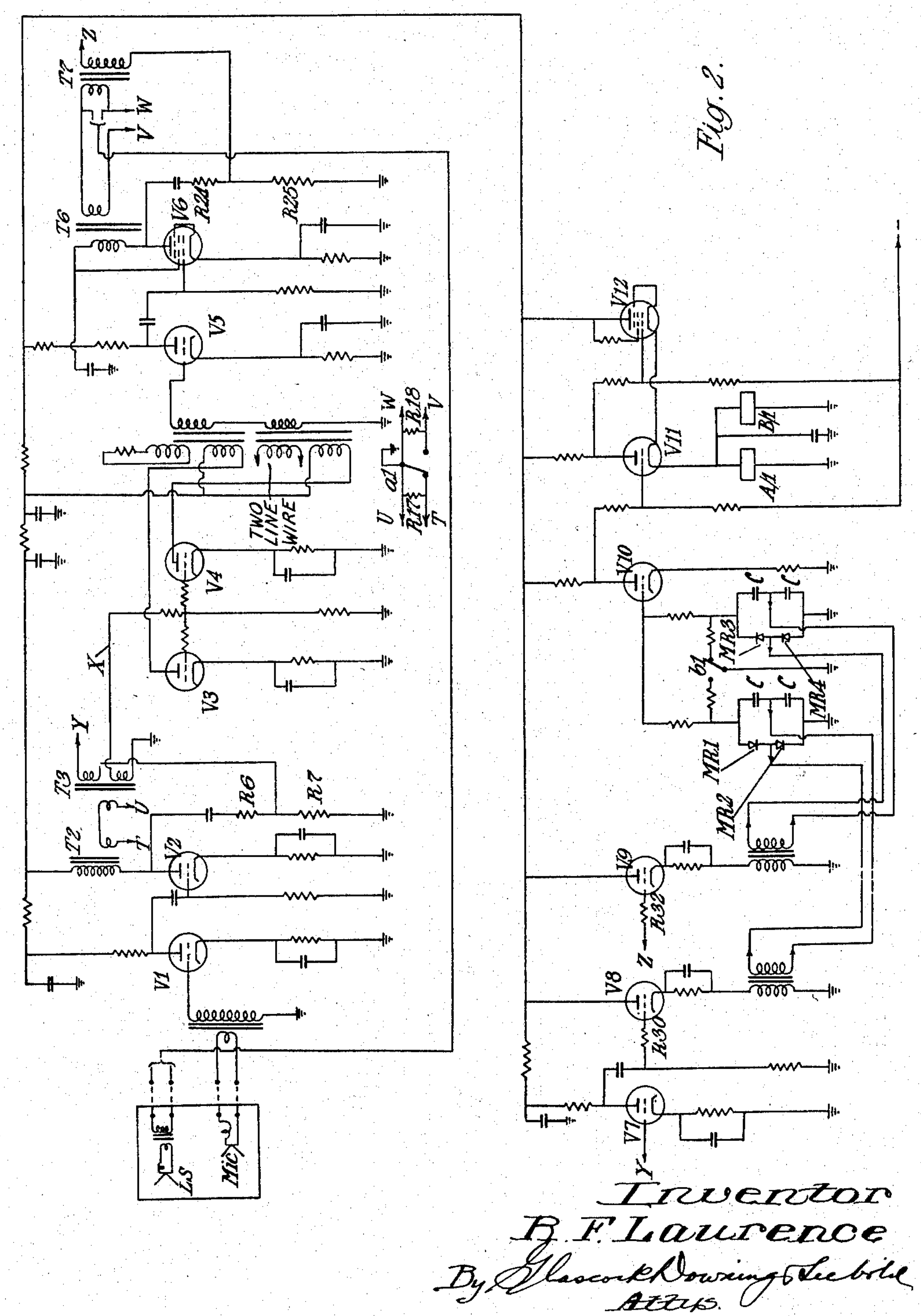
Figure 2 is a circuit diagram of the arrangement of Figure 1.

Referring to Figures 1 and 2 signals from the microphone MIC are amplified by the microphone amplifier MA, comprising valves V1 and V2, and passed via the microphone muting unit MMU, consisting of transformers T2 and T3 and contact *a*1, to the line unit LU, comprising valves V3 and V4. Incoming signals are fed to the line amplifier LA, comprising valves V5 and V6, and via the line muting unit LMU, transformer winding T6, contact *a*1, to the loud-speaker LS.

If the local operator is talking the contact *a*1 connects leads T and U and puts the full signal on the line. Leads V and W are connected through a resistance and only weak signals reach the loud-speaker. If the distant operator is talking contact *a*1 connects leads V and W and puts the full signal into the loud-speaker, while leads T and U are connected through a resistance and only weak microphone signals reach the line.

If the local operator is talking the signals from the centre point of resistance R6, R7 added to the output of transformer T3 are fed over lead Y (auxiliary microphone muting unit AMMU) to the microphone rectifier MR, consisting of rectifiers MR1 and MR2, via the amplifier valve V7 and cathode follower valve V8.

If the distant operator starts talking his signals appear across resistance R25 (auxiliary line muting unit ALMU) in the output valve 6 and these added to the small output from transformer T7 are fed over lead Z to the cathode follower valve V9 and line rectifier LR comprising rectifiers MR3 and MR4. If his signals are large enough the polarity of the potential on the grid of valve V10 will be reversed and the Schmitt trtigger circuit (or muting control unit MCU) comprising valves V11 and V12 will operate the relays A/1, B/1.

This reduces the speech signal between lead Y and earth and increases that between lead Z and earth, relative to the speech signals in the channels, i. e., those applied to the grid of V2 and V6.

This speech signal between lead Y and earth is reduced when contact A1 moves across to short circuit W and V since the connection between T and U is then severed except for the high resistance R17 so that T2 will still have a voltage across it but will not communicate it to T13. When contact A1 is in the position shorting W and V, the signal across Y is the same as the signal across R7. If A1 now moves so as to short circuit T and U the voltage produced across the secondary of T3 by T2 is added to the voltage across R7.

Relay A1 with its contact A2 and circuits controlled thereby thus acts as an attenuating means for the direct control signal produced from the speech signal of the muted channel. If the local operator now talks sufficiently loudly the signal over lead Y again exceeds that over lead Z and the relays A/1, B/1 will be restored to the condition giving the local operator the channel.

The pick-up time of about 3 milliseconds or less is achieved by using a full-wave rectifier and by using a cathode follower as a low impedance signal source to promote rapid charging of the condensers C of the condenser input filter.

The relay contact *a*1 mutes one channel one millisecond before releasing the other.

Leads Y and Z carry signals from their respective speech channels to associated rectifiers at all times.

Lead Y is associated with the microphone in "go" channel and lead Z with the line or "return" channel.

The signals from transformer T3 to lead Y and transformer T7 to lead Z are reduced when the respective transit or receive channel is muted by the short circuiting of TU or VW.

Contacts *a*1 and *b*1 disturb no direct current conditions and so create no large transients.

The relay contact *b*1 switches a relatively low resistance across the condensers C of the rectifiers associated with the muted channel.

The pick-up time is proportional to the capacity of the condenser and the forward resistance of the rectifiers (assuming a low impedance A. C. generator). The discharge time is proportional to the capacity of the condenser and the resistance of the shunt resistance or the back resistance of the rectifier. These quantities are chosen to give the desired result.

The Schmitt trigger circuit or muting control unit MCU comprising valves V11 and V12, driven by the direct coupled amplifier valve V10 has "backlash."

In this trigger circuit a certain stable state may be induced by the application of a sufficiently positive voltage $x$. Increasing this positive voltage maintains the stable state and to trigger the circuit back into the original stable state it will be necessary for the voltage to fall to a new value $y$ which will be appreciably below $x$. $x-y$ is the "backlash" voltage of the circuit.

Amplifier valves V3 and V4 have their grids supplied in parallel from the microphone amplifier and the transformers in their anode circuits have the secondaries connected in series opposition.

Resistances R17 and R18 permit some signals to pass in the muted channel.

Resistances R30 and R32 are of high resistance compared to the driving impedance and feed the cathode follower valves V8 and V9, thus isolating the rectifier system from the speech system.

For use on three wire lines the line unit comprising valves V3 and V4 is dispensed with and the "go" wire is connected to lead X. The "common" wire is connected to earth and the "return" wire to the grid of valve V5. Suitable isolating condensers and transformers can be interposed.

For use on four wire lines the lower secondary winding of transformer T3 is connected to the "go" pair via an isolating condenser if desired, the "return" pair feeds the grid circuit of valve V5 via a condenser and transformer.

Figure 3:
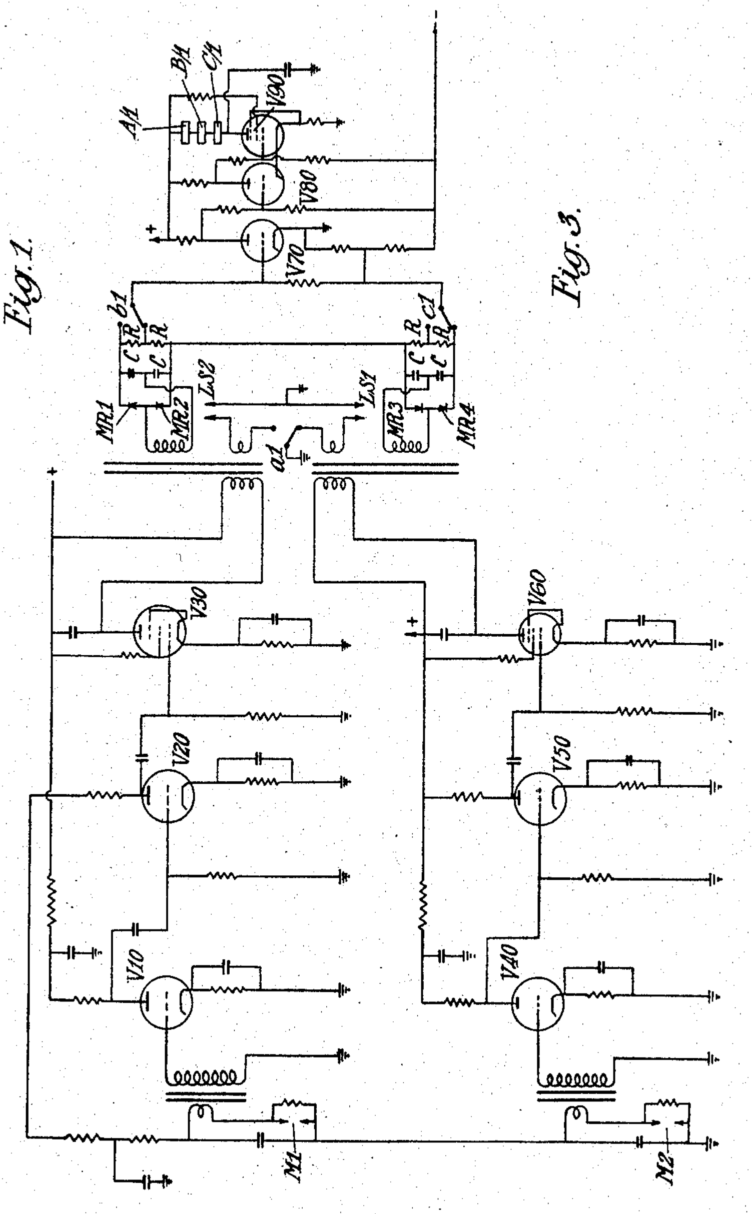
Figure 3 shows a four wire loud-speaking telephone amplifier in which a double central amplifier is used with stations consisting merely of microphones and loud-speakers, connected by long leads to the central amplifier. M1 and LS2 are at one station and M2 and LS1 at the other.

Referring to Figure 3 station A consists of a carbon microphone M1 and a loud speaker LS1. Station B consists of microphone M2 and a loud speaker LS2.

The signals from the microphone M1 are amplified by valves V10, and V20 and V30 and those from microphone M2 by valves V40, V50 and V60.

They are then extended over rectifiers MR and condenser input filters formed by capacitors C and resistances R to the input of valve V70.

If the signals from valve V30 are larger than those from valve V60 the grid of valve V70 is driven far enough in a positive direction relative to the cathode to cause the Schmitt trigger circuit connected to the anode to operate the relays A/1, B/1 and C/1. This increases the direct voltage due to the signals from valve V30 relative to that due to the signals from valve V60, (at contacts *b*1, *c*1), connects loud speaker LS2, and disconnects loud speaker LS1 (at contact *a*1).

To avoid distortion due to the loading of the rectifier systems on valves V30 and V60, the microphones used are chosen for a rising high frequency characteristic and then the condensers in the anode circuits of valves V30 and V60 give a dropping high frequency characteristic at these points.

The use of a microphone with good high frequency output also has the effect of reducing the electrical gain needed at high frequencies thereby reducing the danger of coupling or cross talk between the long, microphone and loud speaker leads which run together from the central amplifier unit to the stations.

Various modifications may be made within the scope of the invention.

I claim:

1. In a loud-speaking telephone system of the kind employing multiple channels each connecting a microphone and a speaker and in which, in order that the loop gain may be less than unity for any loop and oscillation shall not occur, a proportion of the signal in each channel is rectified and the resultant fluctuating direct control signals are compared by a muting control circuit by which the channel producing the smaller signal is muted so that either the "transmit" or the "receive" channel is muted at any time, the muting control circuit being connected to be operated by direct control signals from the signal rectifier systems to mute the channel producing the smaller direct control signal, the improvement which consists of attenuator means associated with each of the channels, and means controlled by the muting control circuit for bringing into effect the attenuator means associated with the muted channel for increasing the ratio of signal amplitude from microphone or line to direct control signal produced therefrom in the case of the muted channel as compared with the unmuted channel.

2. The combination of claim 1 including the additional switch means operable for reducing the proportion of the signal fed to the associated rectifier system when a station is transmitting.

3. In a loud-speaking telephone system of the kind employing multiple channels each connecting a microphone and a speaker and in which, in order that the loop gain may be less than unity for any loop and oscillations shall not occur, a proportion of the signal in each channel is rectified and the resultant fluctuating direct control signals are compared by a muting control circuit by which the channel producing the smaller voltage or current is muted so that either the "transmit" or the "receive" channel is muted at any time, the combination which consists of a full-wave signal rectifier system for each of the channels, amplifiers supplying each of the rectifier systems, said amplifiers being independent of the channels carrying speech signals from one operator to another, attenuator means connected with each of the channels, and switch means controlled by the muting control circuit for bringing into effect the attenuator means associated with the muted channel for increasing the ratio of signal amplitude to direct control signal produced therefrom in the case of the muted channel as compared with the unmuted channel.

4. The combination of claim 3, including means for supplying a signal, a rectifier system amplifier in which the high frequency components of the signal are emphasized and a filter network for attenuating the signal after the amplifier stage whereby the effect of distortion produced by the loading of the rectifier system is minimised.

References Cited in the file of this patent

UNITED STATES PATENTS 2,702,319 Ryall ---------------- Feb. 15, 1955